(12) United States Patent
Tarabulski et al.

(10) Patent No.: US 6,941,746 B2
(45) Date of Patent: Sep. 13, 2005

(54) MOBILE DIESEL SELECTIVE CATALYTIC REDUCTION SYSTEMS AND METHODS

(75) Inventors: Theodore J. Tarabulski, Brewster, NY (US); Jeffrey A. Brooks, Milford, CT (US)

(73) Assignee: Combustion Components Associates, Inc., Monroe, CT (US)

( * ) Notice: Subject to any disclaimer, the term of this patent is extended or adjusted under 35 U.S.C. 154(b) by 0 days.

(21) Appl. No.: 10/718,839

(22) Filed: Nov. 20, 2003

(65) Prior Publication Data

US 2004/0098978 A1 May 27, 2004

Related U.S. Application Data

(60) Provisional application No. 60/428,326, filed on Nov. 21, 2002.

(51) Int. Cl.$^7$ .................................................. F01N 3/00
(52) U.S. Cl. ............................. 60/286; 60/274; 60/276; 60/295
(58) Field of Search .......................... 60/274, 276, 286, 60/295, 301

(56) References Cited

U.S. PATENT DOCUMENTS

| | | | |
|---|---|---|---|
| 4,565,679 A | | 1/1986 | Michalak et al. |
| 5,233,934 A | * | 8/1993 | Krigmont et al. ........... 110/345 |
| 5,369,956 A | | 12/1994 | Daudel et al. |
| 5,540,047 A | | 7/1996 | Dahlheim et al. |
| 5,628,186 A | | 5/1997 | Schmelz |
| 5,785,937 A | | 7/1998 | Neufert et al. |
| 5,845,487 A | | 12/1998 | Fraenkle et al. |
| 5,849,593 A | | 12/1998 | Schmelz |

(Continued)

FOREIGN PATENT DOCUMENTS

| | | |
|---|---|---|
| DE | 33 37 793 | 5/1985 |
| DE | 37 21 572 | 2/1988 |
| DE | 42 17 552 | 8/1993 |
| EP | 0 362 483 | 4/1990 |
| EP | 0 515 857 | 12/1992 |
| EP | 0 555 746 | 8/1993 |
| WO | 96/04980 | 2/1996 |

OTHER PUBLICATIONS

News Release, Clean Diesel Technologies, Inc., "Clean Diesel Technologies Applies Aris® Mobile Nitrogen Oxide Reduction System to Medium Duty Delivery Truck", Sep. 25, 2002 (2 pages).

Press Release, "Mobil Reduces NOx Emissions by 82% and 92% from Diesel and Natural Gas Test Engines Using Johnson Matthey Urea SCR (Selective Catalytic Reduction) System", Dec. 6, 1999 ttp://www.jmcsd.com/html/mobil.html (2 pages).

*Primary Examiner*—Thomas Denion
*Assistant Examiner*—Diem Tran
(74) *Attorney, Agent, or Firm*—Lipsitz & McAllister, LLC (57) ABSTRACT

The present invention provides for the retrofitting diesel truck engines with a system to reduce NOx emissions. The SCR system of the present invention, including a controller, a reagent tank, and an injection system, is installed on a vehicle. A NOx detector is temporarily installed as part of the system. The vehicle is then operated to collect engine parameters including fuel injection timing, RPM, load, exhaust heat, exhaust flow rate, and the like, together with measurements of the NOx emissions under various operating conditions. Based on the recorded data at various operating conditions, a reagent injection strategy is developed and installed at the reagent injection controller. During vehicle operation, the injector injects reagent into the exhaust system based on control signals from the reagent injection controller in accordance with the injection strategy in order to reduce NOx emissions at the various operating conditions.

15 Claims, 4 Drawing Sheets

U.S. PATENT DOCUMENTS

| | | |
|---|---|---|
| 5,924,280 A | 7/1999 | Tarabulski |
| 5,976,475 A | 11/1999 | Peter-Hoblyn et al. |
| 6,063,350 A | 5/2000 | Tarabulski et al. |
| 6,125,629 A | 10/2000 | Patchett |
| 6,279,603 B1 | 8/2001 | Czarnik et al. |
| 6,295,809 B1 * | 10/2001 | Hammerle et al. ............ 60/286 |
| 6,305,160 B1 * | 10/2001 | Hammerle et al. ............ 60/274 |
| 6,378,515 B1 * | 4/2002 | Geyer ........................ 123/683 |
| 6,415,602 B1 | 7/2002 | Patchett et al. |
| 6,422,005 B2 | 7/2002 | Dölling et al. |
| 6,427,439 B1 * | 8/2002 | Xu et al. ...................... 60/286 |
| 6,442,932 B1 | 9/2002 | Hofmann et al. |
| 6,467,257 B1 | 10/2002 | Khair et al. |
| 6,470,676 B2 | 10/2002 | Dölling et al. |
| 6,471,927 B2 | 10/2002 | Hofmann et al. |
| 6,546,720 B2 * | 4/2003 | van Nieuwstadt ............ 60/286 |
| 6,725,651 B2 * | 4/2004 | Itoh et al. ..................... 60/286 |

* cited by examiner

MOBILE DIESEL SELECTIVE CATALYTIC REDUCTION SYSTEMS AND METHODS

This application claims the benefit of U.S. provisional patent application No. 60/428,326 filed on Nov. 21, 2002, which is incorporated herein and made a part hereof by reference.

BACKGROUND OF THE INVENTION

The present invention relates generally to the reduction of emissions produced by lean burn engines. In particular, the present invention provides improved systems and methods for reducing oxides of nitrogen (NOx) emissions from existing in-use diesel engines.

According to EPA, on-highway trucks account for 10% of all NOx emissions and over 30% of the on-highway NOx emissions. Selective Catalytic Reduction (SCR) can reduce NOx emissions by 60–85% over the EPA heavy duty Transient Emissions Test. SCR technology is considered to be a leading technology to help truck engines meet the stringent 2007 model year NOx emission standards.

An example of prior art SCR technology is disclosed in U.S. Pat. No. 5,924,280 to Tarabulski entitled "Reducing NOx Emissions from an Engine While Maximizing Fuel Economy" which is incorporated herein and made a part hereof by reference. U.S. Pat. No. 5,924,280 employs SCR and EGR technology in combination over various engine load operating ranges.

The NOx mass flow from in-use diesel engines varies based on the year of manufacture, horsepower, options/features for driver convenience, fuel economy benefit and/or to meet legislated emissions limits. The use of selective catalytic reduction requires the injection of a reagent proportional to the mass flow of the NOx output from the diesel engine. For engines with or without SCR systems, NOx output is estimated in some manner, as there is no feedback system available that has the response time to reliably, economically and continuously determine NOx mass flow on a commercial vehicle.

It is necessary for engine manufacturers to assure NOx mass flow is below legislated limits for new and in-use engines. Further, to retrofit an SCR system, the process of determining NOx mass flow needs to be revisited for each engine type, horsepower rating, and engine map.

There are numerous state or local government incentives being created to encourage equipment owners to apply retrofit technology.

It would be advantageous to provide a cost-effective solution for retrofitting existing mobile diesel truck fleets with SCR technology. It would also be advantageous to retrofit equipment with an SCR system without extensive downtime, engine removal, dynamometer tests, or road trips to test facilities. It would be further advantageous to provide methods and systems for customizing SCR systems for retrofitting on various types and models of diesel trucks, based on an initial testing period to determine NOx emissions under various conditions. It would be further advantageous to use a reagent in the SCR system.

The methods and systems of the present invention provide the foregoing and other advantages.

SUMMARY OF THE INVENTION

The present invention provides improved systems and methods for retrofitting an SCR system to diesel trucks in order to reduce NOx emissions.

The present invention reduces NOx emissions in diesel engines by metering precise amounts of a reagent, such as 32% non-toxic urea solution reagent, into the exhaust stream of a diesel engine. Urea is a non-toxic chemical commercially available from multiple suppliers. Once in the exhaust, the reagent vaporizes, mixes with oxides of nitrogen and passes over a catalyst which turns the ozone-forming oxides of nitrogen (NOx) into water, nitrogen, and $CO_2$.

A map of urea injection quantity ("injection map") is developed by installing a data acquisition system/controller that measures all the parameters required to calculate the NOx mass flow while the engine is in use. Included in the list of parameters measured is the parameter of engine fuel injection timing. Additional parameters may include engine RPM, load, exhaust temperature, mass flow (exhaust), and the like. Further, the controller may use one of the engine operating parameters, for example, engine fuel injection timing, as a basis for determining reagent injection quantity. This feature enables the retrofit system to adapt to changing NOx mass flow as a result of engine operating conditions. The engine operating parameters can be measured either by paralleling the output of existing sensors or the addition of new sensors. Alternatively, the engine operating parameters can be retrieved from the vehicle data bus.

The cost of the technology is projected to be well below the current typical regulatory guidelines of $13,000 per ton of NOx reduced for fleet quantities. Table I shows some typical vehicle application data where the SCR Technology of the present invention may be utilized.

TABLE 1

Potential NOx Benefit of Selective Catalytic Reduction on Heavy-Duty Trucks

| ENGINE MODEL YEAR | 2002 | 1998 | 1991 | 1988 | UNITS |
|---|---|---|---|---|---|
| NOx Emissions Rating | 2.5 | 4 | 5 | 8 | G/bhp-hr |
| NOx Reduction | 70% | 70% | 70% | 70% | % |
| Annual Miles (Thousands) | 125 | 125 | 125 | 125 | Miles |
| Average Speed | 50 | 50 | 50 | 50 | Mph |
| Engine Load Factor | 70 | 70 | 70 | 70 | Load factor |
| Rated Horsepower | 350 | 350 | 350 | 350 | Hp |
| NOx Eliminated | 1.2 | 1.9 | 2.4 | 3.8 | Tons/year |
| 32 wt % Urea Consumption | 546 | 874 | 1,093 | 1,749 | Gal./year |
| Cost Effectiveness | 4200 | 2800 | 2300 | 1700 | $/ton |

In an example embodiment of the invention, a system for reducing NOx emissions in diesel engine exhaust is provided. The system is comprised of an engine control unit for determining at least one engine operating parameter for each of a plurality of engine operating conditions. A temporary NOx detector is provided for detecting respective NOx emissions of the exhaust at each of the engine operating conditions. A reagent injection controller is provided for implementing an injection strategy developed based on the at least one engine operating parameter at the respective operating condition and the respective detected NOx emissions. A reagent tank mounted on the vehicle stores a reagent. A delivery module is provided for delivering the reagent from the reagent tank. An exhaust system is provided having a catalyst. An injector module is provided for receiving the reagent from the delivery module and injecting the reagent into the exhaust system at a variable flow rate in response to signals received from the reagent injection controller, in order to reduce NOx emissions at the various operating conditions in accordance with the injection strategy. The variable flow rate of the injector module is controlled by the reagent injection controller in accordance with the injection strategy based on input of one or more of the engine operating parameters.

The engine operating parameters may comprise at least one of fuel injection timing, exhaust temperature, RPM, load, engine speed, exhaust mass flow, cam position, crank angle position, fuel injection signal, or the like.

The reagent may comprise one of an aqueous urea reagent, aqueous ammonia, anhydrous ammonia, a hydrocarbon based reagent, or the like.

In one example embodiment, the injection strategy may be developed automatically by one or more algorithms in the reagent injection controller.

In an alternate example embodiment, the injection strategy may be developed by post-processing the detected NOx emissions and at least one engine operating parameter. The injection strategy may be downloaded to the reagent injection controller.

The injection strategy may be provided in the form of multiple injection maps. The multiple injection maps may be provided in lookup tables at the reagent injection controller.

The engine operating conditions may be generated on a dynamometer. Alternatively, the engine operating conditions may be generated by normal operation of a vehicle. For example, the vehicle may be operated through particular drive cycles to generate the plurality of engine operating conditions.

Another alternative is that the engine manufacturer may provide a signal that is proportional to NOx output. This signal may then be used as an input to the reagent injection controller.

Once the vehicle injection strategy is determined through normal vehicle use and/or by dynamometer, the data may be inspected to identify operating voids. Particular drive cycles may then be specified to obtain engine operating conditions corresponding to the voids.

The catalyst may comprise at least one SCR catalyst bed having selective catalytic reduction properties to enable conversion of the NOx emissions into water, nitrogen and carbon dioxide after interaction with the reagent. The SCR catalyst bed may comprise at least one of titanium oxide, vanadium, molybdenum, zeolite, or tungsten oxide.

The temporary NOx detector may be removed after the injection strategy is implemented at the reagent injection controller.

The NOx detector may comprise a NOx meter located external to the exhaust system. Alternatively, the NOx detector may comprise a NOx sensor within the exhaust system.

Methods for implementing the invention are also provided which correspond to the systems described above.

BRIEF DESCRIPTION OF THE DRAWINGS

The present invention will hereinafter be described in conjunction with the appended drawing figures, wherein like numerals denote like elements, and.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an example embodiment of the invention. It should be understood that various changes may be made in the function and arrangement of elements without departing from the spirit and scope of the invention as set forth in the appended claims.

Figure 1:
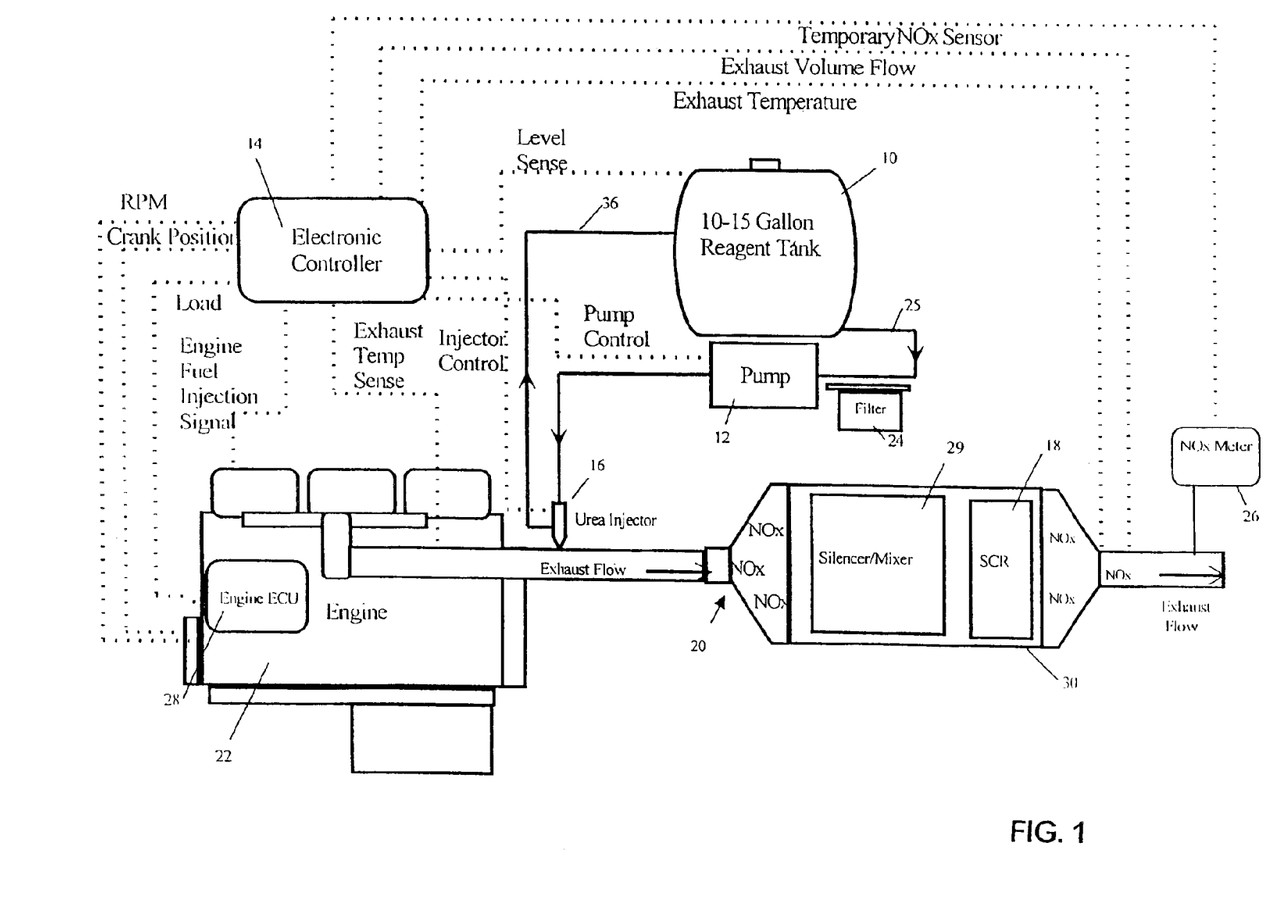
FIG. 1 shows a block diagram of an example embodiment of the present invention.

An example embodiment of the SCR system of the present invention is shown in FIG. 1. In FIG. 1, solid lines between the elements of the system denote fluid lines and dashed lines denote electrical connections. The system of the present invention may include reagent tank 10 for holding the reagent and a delivery module 12 for delivering the reagent from the tank 10. The tank 10 and delivery module 12 may form an integrated reagent tank/delivery module. Also provided as part of the system is an injection control unit 14, an injector module 16, and an exhaust system 20 having at least one catalyst bed 18.

Figure 2:
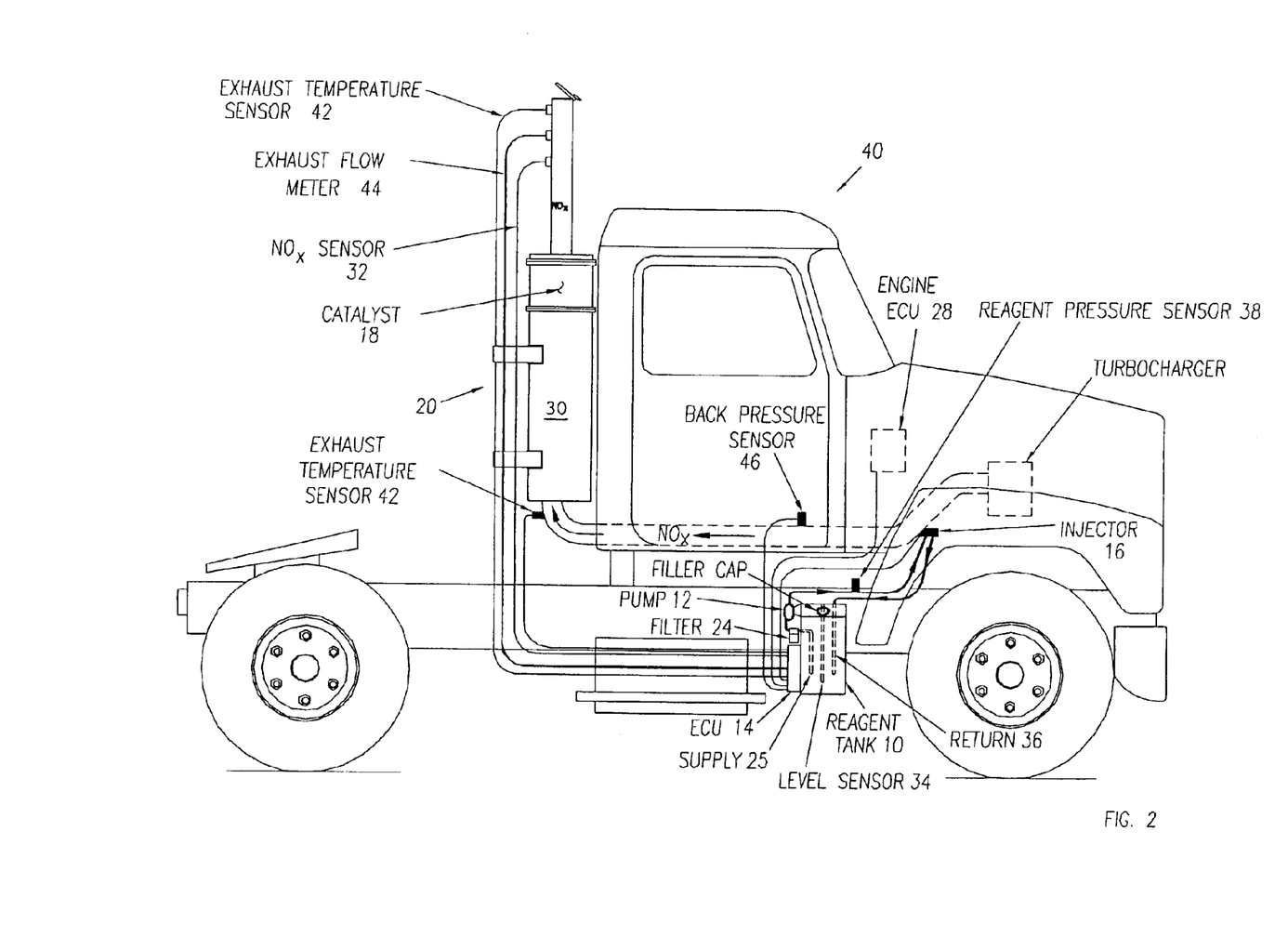
FIG. 2 shows an example embodiment of the present invention as installed on a diesel truck.

The system provided by the present invention may be installed on a diesel engine 22. FIG. 2 illustrates an example embodiment of the invention as installed on a diesel truck 40.

The delivery module 12 may comprise a pump that is supplied reagent from the tank 10 through an in-line filter 24 via a supply line 25. The reagent tank 10 may be polypropylene, epoxy coated carbon steel, PVC, or stainless steel and sized according to the application (e.g., vehicle size, intended use of the vehicle, and the like). The filter 24 may include a housing constructed of rigid plastic with a removable cartridge. A pressure regulator (not shown) may be provided to maintain the system at an approximately constant pressure (e.g., approximately 60 psi) and may be located in the return line 36 from the injector 16. As shown in FIG. 2, a pressure sensor 38 may be provided in the flexible line leading to the reagent injector 16. The system may also incorporate various freeze protection strategies to unthaw frozen urea or to prevent the urea from freezing.

Although the present invention is described below as using an aqueous urea reagent, the invention may also be implemented using a variety of reagents, including aqueous ammonia, anhydrous ammonia, hydrocarbon based reagents, and other reagents as known in the art.

The injector module 16 may consist of an injector, injector boss, and a flexible line (e.g., a stainless steel braided, Teflon lined flexible line). The injector 16 may be operated at 10 Hz and may be controlled by the reagent injection controller 14 using pulse width modulation.

The amount of reagent required may vary with load, engine RPM, engine speed, exhaust gas temperature, exhaust gas flow, engine fuel injection timing, and desired NOx reduction. All or some of the engine operating parameters may be supplied from the engine control unit 28 via the engine/vehicle databus to the reagent injection controller 14. The reagent control could also be included in the engine control unit 28 if the truck manufacturer agrees to provide that functionality.

Exhaust gas temperature may be measured by an exhaust gas temperature sensor 42. Exhaust gas temperature may be measured at two locations as shown in FIG. 2 (i.e., by sensors 42 before and after the exhaust canister 30). Exhaust gas flow may be measured by an exhaust gas flow meter 44. Exhaust back pressure may be measured by sensor 46.

A minimum reagent level switch 34 or programmed logic based on voltage may be used to prevent the injection system from running dry and overheating. Once a minimum reagent level in the tank 10 is reached, injection will cease and a fault light and/or a text alarm will illuminate in the cab of the vehicle.

The injection rate may be set by programming the reagent injection controller 14 with an injection control strategy or map. The injection strategy may be developed by temporarily installing a NOx detector 26 on the vehicle 40. The NOx detector 26 may be a sensor or a meter with a sampling system. FIG. 1 shows a NOx meter 26 which analyzes the gas concentration or mass at a location external to the exhaust system 20. Alternatively, a sensor 32 may be provided within the exhaust system 20 which detects the concentration or mass of the gas in the exhaust stream as shown in FIG. 2.

Once the NOx detector 26 (or sensor 32) is installed, the vehicle 40 is then operated in a normal manner and the NOx mass flow generated under various operating conditions is measured. Various engine operating parameters for the respective operating conditions are also measured. Based on the measured NOx mass flow and the engine operating parameters, the quantity of the reagent required to be injected can be determined for the various engine operating conditions. After this "learn period" is over, the engine reagent mass flow can be accurately estimated for open loop operation via the data recorded during the learn period. The injection strategy (injection map) can be developed automatically by algorithms in the reagent injection controller 14 or via post-processing the acquired data and downloading the required control strategies to the injection controller 14. The injection map may be provided in the form of a lookup table in the injection controller 14.

The present invention provides a basis for developing an injection control strategy without extensive engine dynamometer testing, but rather by simply installing the reagent injection controller 14 on board the vehicle with the sensors and/or meters needed for control strategy development and for continual operation of the SCR system.

Alternatively, the control strategy may be developed on a dynamometer, and one or more of the engine operating parameters may be used as feedback for the reagent injection controller 14 in-use. Further, dynamometer testing may be used in connection with the in-use testing using the temporary NOx detector 26 or sensor 32 to develop the control strategy.

Once the vehicle NOx flow map calculations are determined through normal vehicle use and/or by dynamometer testing, the data may be inspected to identify operating voids. The vehicle may then be driven through specific drive cycles to "learn-in" the voids in the map. Alternatively, the vehicle could be run through prescribed cycles as well as normal operation, either on the road or on a chassis dynamometer. Once the map is obtained and the desired NOx reduction levels are reached, the temporary NOx detector 26 (or sensor 32) can be removed from the system.

Engine operating parameters such as engine load, RPM, speed, exhaust temperature, exhaust flow rate, engine fuel injection timing cam position, crank angle position, fuel injection signal, and reagent temperature may be provided as inputs to the reagent injection controller 14. The controller 14 processes the signals. Based on the input values of the engine operating parameters and the control strategy (which may be provided in the form of a lookup table at the reagent injection controller 14), the reagent injection controller 14 will send a signal to the injector 16 to control the reagent injection flow rate into the exhaust stream.

The urea mixes with the exhaust gas and decomposes into ammonia prior to passing through at least one exhaust catalyst bed 18. The exhaust gas may be mixed by means of a mixer 29 (as shown in FIG. 1) prior to passing through to the SCR catalyst beds 18. There may be multiple catalyst layers within the exhaust canister 30 to ensure adequate NOx conversion, with a muffler following the second catalyst layer. The SCR catalyst 18 may be based on titanium oxide with additions of metal oxides such as, for example, vanadium, molybdenum, tungsten oxide, and/or zeolite, which reacts with the ammonia and NOx to form environmentally harmless nitrogen, oxygen, and water. The SCR catalyst 18 may alternatively be based on other materials as is commonly known in the art.

A further benefit of the present invention is that it allows for measuring in-use emissions compliance of the vehicle rather than compliance during operation over an esoteric test cycle that may or may not be relevant to normal operation.

The present invention provides control strategies for catalyst-temperature compensation through transient and steady state operation. Acceleration and deceleration strategies may be provided to compensate for ammonia storage and/or thermal storage in the catalyst 18.

The present invention also provides catalyst deterioration or deactivation compensation. If the % NOx reduced over time changes with the reagent quantity held constant, the injector 16 injects more reagent to keep NOx reduction constant or reduces injection quantity to keep ammonia slip at a minimum.

The present invention may be implemented with the NOx sample location (s) before and/or after the catalyst and with the reagent injector on or off. Dual NOx meters/sensors may be used.

In an example embodiment of the invention, the reagent injection controller 14 controls the injector 16 to meter precise amounts of a non-hazardous 32% by weight aqueous urea solution into the exhaust stream of a diesel engine. The reagent is non-toxic and is widely available from a multitude of commercial suppliers. Once in the hot exhaust stream, the reagent decomposes to form ammonia, mixes with the NOx and passes over an exhaust gas catalyst 18 which turns the ozone-forming NOx into water, nitrogen, and $CO_2$. A 70–90% reduction in NOx requires reagent volume equivalent to approximately 4–8% of the engine fuel consumption. The target emission reduction for the SCR system of the present invention is 60–70% in-use and 90% at high load steady state operation. The amount of reagent consumed will increase with the amount of NOx reduction required and the amount of NOx emitted by the truck. The present invention enables determination of the applicability of the urea SCR and provides a map of the necessary injection criteria without extensive downtime or dynamometer tests of the vehicle.

Figure 3:
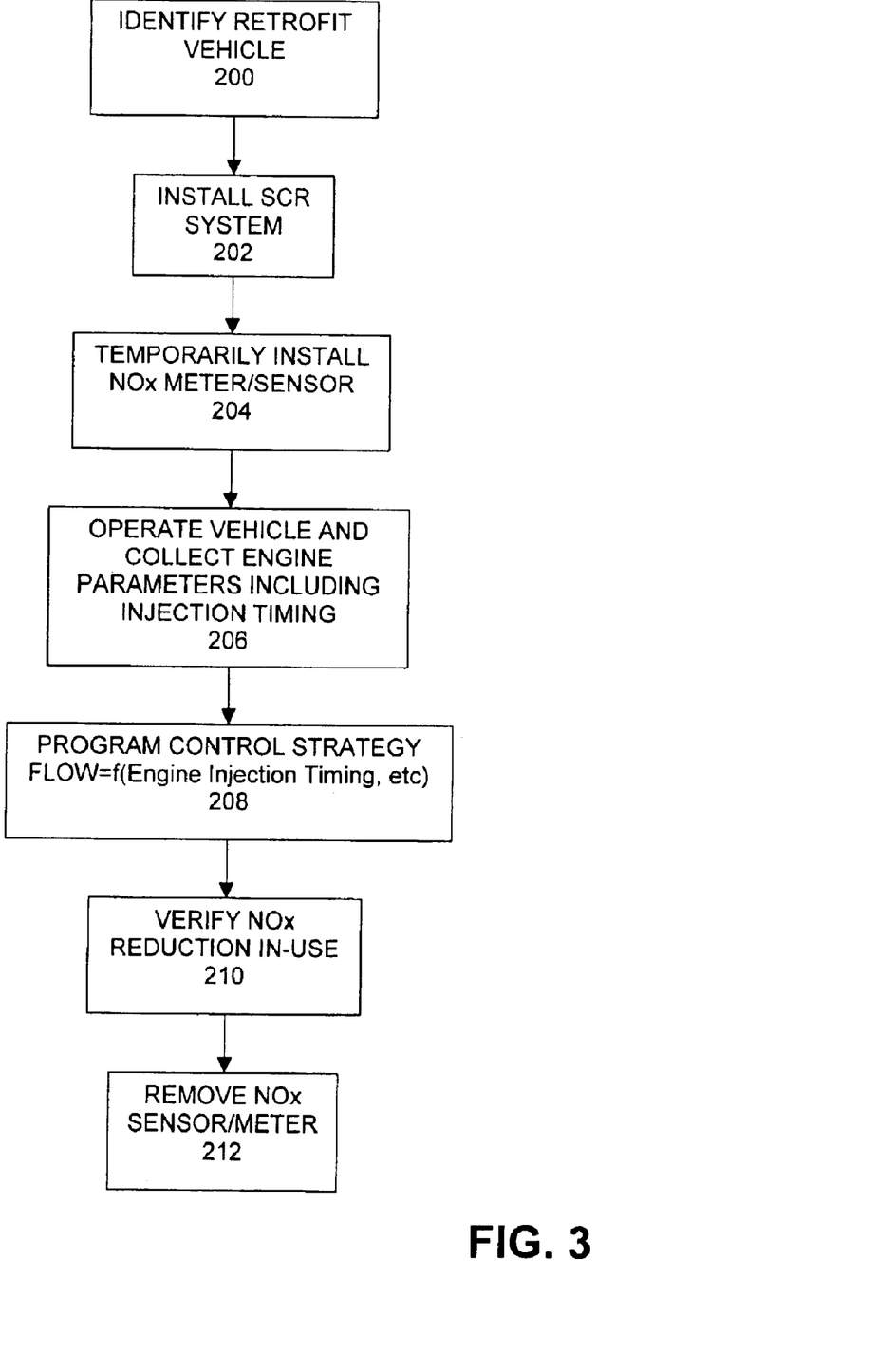
FIG. 3 shows a flowchart of an example embodiment of the present invention.

FIG. 3 shows an example of a process for retrofitting a vehicle with the SCR NOx reduction system of the present invention. First, the vehicle to be retrofitted is identified (200). Next, the system of the present invention is installed on the vehicle (202). A NOx meter or sensor is temporarily installed (204). The vehicle is then operated to collect engine parameters including fuel injection timing, RPM, load, exhaust heat, exhaust flow rate, and the like, together with measurements of the NOx emissions under various operating conditions (206). Based on the recorded data at various operating conditions, a program control strategy is developed and installed at the controller (208). The program control strategy may be installed at the controller using a variety of methods, including, for example, automatically filling in values of existing injection control maps, using algorithms in the controller which automatically develop the control strategy from the collected data, or post-processing the collected data to develop the control strategy and then downloading the control strategy to the controller.

Once the control strategy has been installed at the controller, the system is then checked to verify that the desired NOx reduction has occurred (210). If the desired levels of NOx reduction are achieved, the temporary NOx sensor/meter can be removed from the system (212). Once a program control strategy map is developed for a particular truck type, the system may be implemented in any truck of that exact type without further testing.

Figure 4:
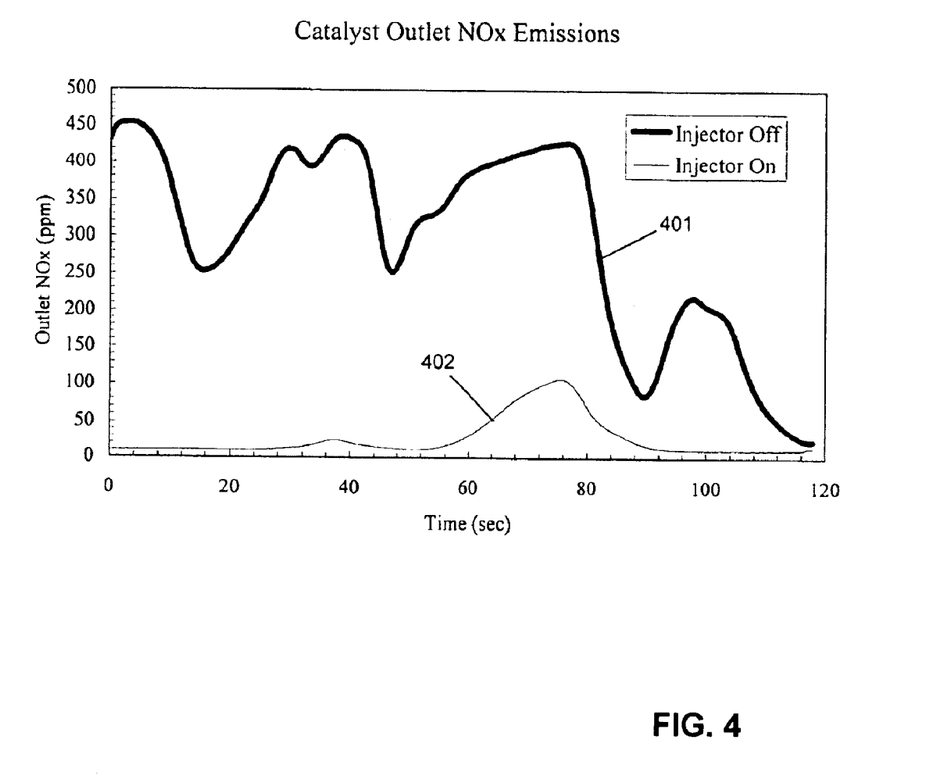
FIG. 4 shows a graph of NOx reductions achieved with the present invention.

A 2000 GMC medium-duty truck was used to evaluate the inventive system components. FIG. 4 shows the measurement of NOx detected over time for the 2000 GMC truck with the injector turned off (plot 401) and with the injector turned on (plot 402). As shown in FIG. 4, a greater than 70% NOx reduction was achieved using the present invention over normal on-road service as measured by an on-board NOx measuring system.

The SCR technology of the present invention is applicable to all lean burn engines, including but not limited to mobile and off-road diesel engines, as well as portable diesel engines. The invention provides the ability to dramatically reduce NOx emissions with no fuel economy penalty as is found with exhaust gas recirculation (EGR) equipped diesel engines.

However, the present invention may also be implemented on an EGR equipped engine. In such an embodiment, supplemental EGR control may be provided which overrides an existing OEM EGR control strategy where it is advantageous for fuel economy. Alternatively, EGR control can remain unmodified and matched with an SCR control strategy which is developed in accordance with the present invention.

With the reagent injection system operating using urea or other nitrogen based reagent, an analyzer could also be provided to periodically measure ammonia concentrate in the exhaust gas and reduce injection quantities during transient or steady state operation. Ammonia emission is the result of an excess of a nitrogen based reagent being injected into the exhaust. If a hydrocarbon reagent is used, a hydrocarbon meter may be provided to determine whether excess hydrocarbon is being injected so that the injection rate of the reagent can be adjusted accordingly.

The invention also includes a wiring system that allows temporary equipment to be installed and/or removed quickly to enable the rapid development of a control strategy and to install the required equipment for reagent injection.

The present invention enables compliance with the accelerated 2004 and 2004 new on highway heavy duty diesel emission NOx standard without exhaust gas recirculation. If a truck fleet is specifying new engines to meet lower emissions standards, substantial savings can be realized by fitting existing engines with the SCR system of the present invention, rather than purchasing a new EGR equipped engine with it's inherent fuel economy penalty and durability problems.

Those skilled in the art will appreciate that the amount of NOx reduction, operating cost and cost effectiveness for the urea SCR system of the present invention will be dependent upon the engine vintage, exhaust temperature, driving cycle, payback criteria and uncontrolled NOx levels.

It should now be appreciated that the present invention provides advantageous methods and apparatus for reducing NOx emissions in diesel engines.

Although the invention has been described in connection with various illustrated embodiments, numerous modifications and adaptations may be made thereto without departing from the spirit and scope of the invention as set forth in the claims.

What is claimed is:

1. A method for reducing NOx emissions in diesel engine exhaust installed in a vehicle, comprising:
   determining at least one engine operating parameter for each of a plurality of engine operating conditions generated during normal operation of said vehicle;
   temporarily installing a NOx detector for detecting respective NOx emissions at each of said engine operating conditions;
   developing an injection strategy based on said at least one engine operating parameter at said respective operating condition of said vehicle and said respective detected NOx emissions;
   removing said NOx detector responsive to said development of said injection strategy;
   controlling the injection of a reagent into the exhaust at a variable flow rate in order to reduce NOx emissions at said various operating conditions in accordance with said injection strategy;
   wherein:
   said variable flow rate of said reagent is controlled by a reagent injection controller in accordance with said injection strategy based on input of one or more of said engine operating parameters.

2. A method in accordance with claim 1, wherein said at least one engine operating parameter comprises at least one of fuel injection timing, exhaust temperature, RPM, load, engine speed, exhaust mass flow, cam position, crank angle position, or fuel injection signal.

3. A method in accordance with claim 1, wherein said reagent comprises one of an aqueous urea reagent, aqueous ammonia, anhydrous ammonia, or a hydrocarbon based reagent.

4. A method in accordance with claim 1, wherein said injection strategy is developed automatically by one or more algorithms in the reagent injection controller.

5. A method in accordance with claim 1, further comprising:
   specifying particular drive cycles for said normal operation of said vehicle to generate said plurality of engine operating conditions.

6. A method in accordance with claim 1, further comprising:
   identifying operating voids in said plurality of engine operating conditions;
   specifying particular drive cycles to obtain engine operating conditions corresponding to said voids.

7. A method in accordance with claim 1, wherein:
   said NOx is temporarily detected by the temporary NOx detector.

8. A method in accordance with claim 1, wherein temporary NOx detector comprises a NOx meter temporarily located external to the exhaust system.

9. A method in accordance with claim 1, wherein said temporary NOx detector comprises a NOx sensor temporarily installed within the exhaust system.

10. A method in accordance with claim 1, wherein said injection strategy is developed by post-processing the detected NOx emissions and the at least one engine operating parameter.

11. A method in accordance with claim 10, wherein said injection strategy is downloaded to the reagent injection controller.

12. A method in accordance with claim 1, wherein said injection strategy is provided in the form of multiple injection maps.

13. A method in accordance with claim 12, wherein said multiple injection maps are provided in lookup tables at said reagent injection controller.

14. A method in accordance with claim 1, further comprising:
providing at least one SCR catalyst bed in an exhaust system having selective catalytic reduction properties to enable conversion of said Nox emissions into water, nitrogen and carbon dioxide after interaction with said reagent.

15. A method in accordance with claim 14, wherein said SCR catalyst bed comprises at least one of titanium oxide, vanadium, molybdenum, tungsten oxide, or zeolite.

* * * * *